(12) United States Patent
Mayo et al.

(10) Patent No.: US 9,532,085 B2
(45) Date of Patent: Dec. 27, 2016

(54) METHODS AND SYSTEMS FOR ONLINE ADVERTISING

(75) Inventors: Diana L. Mayo, St. Louis, MO (US); Amanda Culbertson-Kraemer, St. Louis, MO (US)

(73) Assignee: Nestec SA, Vevey (CH)

( * ) Notice: Subject to any disclaimer, the term of this patent is extended or adjusted under 35 U.S.C. 154(b) by 700 days.

(21) Appl. No.: 13/068,934

(22) Filed: May 24, 2011

(65) Prior Publication Data

US 2011/0302601 A1    Dec. 8, 2011

Related U.S. Application Data

(60) Provisional application No. 61/396,821, filed on Jun. 3, 2010.

(51) Int. Cl.
*H04N 5/445* (2011.01)
*H04N 21/234* (2011.01)
*H04N 21/4143* (2011.01)
*H04N 21/472* (2011.01)
*H04N 21/81* (2011.01)

(52) U.S. Cl.
CPC .... *H04N 21/23412* (2013.01); *H04N 21/4143* (2013.01); *H04N 21/47205* (2013.01); *H04N 21/812* (2013.01)

(58) Field of Classification Search
USPC ..................................................... 725/42, 43
See application file for complete search history.

(56) References Cited

U.S. PATENT DOCUMENTS

| 2005/0149406 | A1* | 7/2005 | Bascobert et al. ............... 705/14 |
| 2007/0028185 | A1* | 2/2007 | Bhogal et al. ................. 715/808 |
| 2007/0208616 | A1* | 9/2007 | Choi ................................. 705/14 |
| 2010/0023398 | A1* | 1/2010 | Brown et al. .............. 705/14.49 |
| 2010/0306043 | A1* | 12/2010 | Lindsay et al. ............ 705/14.41 |

* cited by examiner

*Primary Examiner* — Michael Hong
(74) *Attorney, Agent, or Firm* — Ronald A. Burchett

(57) ABSTRACT

A portal webpage or other entry content is provided that includes a selectable region of content. A video-rich icon is enabled. The video-rich icon may encourage a user to select the selectable region of the content. An indication of selection to the selectable region of content is received. Destination content is provided and may include an additional selectable region of content. An additional video-rich icon is enabled on the provided destination content. The additional video-rich icon may encourage a user to select the additional selectable region of content.

22 Claims, 7 Drawing Sheets

METHODS AND SYSTEMS FOR ONLINE ADVERTISING

CROSS REFERENCE TO RELATED APPLICATIONS

This application claims priority to U.S. Provisional Application Ser. No. 61/396,821 filed Jun. 3, 2010, the disclosure of which is incorporated herein by this reference.

BACKGROUND OF THE INVENTION

Field of the Invention

The invention relates generally to methods and systems for advertising and particularly to methods and systems for online advertising.

Description of Related Art

As the popularity of the Internet grows, more and more individuals are eschewing traditional media sources. For example, overall newspaper readership and television viewing has decreased as users prefer to receive their news online and view television shows through websites. Such a change in media viewing habits by users has made it more difficult for manufacturers to market their products because users typically do not view manufacturer's websites and because current methods for online advertising are not effective.

Typical methods for online advertising use banners or other types of graphics to entice users. These banners either entice the user to click on them and then redirect them to a manufacturer's website, or entice them to interact with the banner through a game or other interactive content. However, both types of banners are often ineffective because they require the user to disengage from a current browsing experience, which the user typically is not inclined to do. There is, therefore, a need for new methods and systems for online advertising, particularly methods and systems that do not require users to disengage from their current browsing experience and that keep them engaged in web-based content.

SUMMARY OF THE INVENTION

It is, therefore, an object of the invention to provide an online advertising experience to influence the behavior of consumers to keep them engaged in web-based content.

It is another object of the invention to provide an online advertising experience that leads consumers to additional content, such as branded content.

It is yet another object of the invention to provide an online advertising experience that provides incentives and rewards to a consumer for their continued engagement with their browsing experience as it relates to branded content.

These and other objects of the invention are achieved through the use of methods and systems employing a video-rich icon, which provides an enhanced browsing experience for a user of a website and encourages the user to interact with sponsored content. The methods and systems further provide incentives for a user to interact with sponsored content or the video-rich icon.

In an implementation, a webpage or other entry content is provided by a computing device. The webpage or other entry content includes a selectable region of content. A video-rich icon is enabled on the webpage or other entry content by the computing device. The video-rich icon may encourage a user to select the selectable region of the content. An indication of selection to the selectable region of content is received by the computing device, and a second webpage or destination content is provided by the computing device. The second webpage or destination content may include an additional selectable region of content. An additional video-rich icon, which may be the same as or different from the first video-rich icon encountered in the experience, is enabled on the second webpage or destination content. The additional video-rich icon may encourage a user to select the additional selectable region of content. This process is may be repeated as the user is encouraged to select one or more subsequent webpages or destination contents.

Implementations may include some or all of the following features. The entry content and/or the destination content may include an indicator or identifier of an incentive for selecting the selectable region of content. An incentive associated with the destination content may be greater than the incentive associated with the entry content. For example, the incentive associated with the entry content may be a coupon having a first value and the incentive associated with the destination content may be a coupon having a second value that is greater than the first value. The video-rich icon may be implemented using a takeover. The video-rich icon(s) may comprise one or more animated videos of an animal. The content may be sponsored content.

In an implementation, a first sponsored content is provided for display on a first webpage by a computing device. A first video-rich icon is provided for display on the first webpage by the computing device. The first video-rich icon may encourage a user to select the first sponsored content. An indication of selection to the first sponsored content is received by the computing device. A second sponsored content for display on a second webpage and a second video-rich icon for display on the second webpage are provided by the computing device in response to the indication of selection. The second video-rich icon may encourage the user to select the second sponsored content.

Implementations may include some or all of the following features. An indicator of a first incentive for selecting the first sponsored content may be provided. An identifier of the user may be determined, and the first incentive may be determined based on the identifier of the user. An indicator of a second incentive for selecting the second sponsored content may be provided. An indication of a selection of the second sponsored content may be received. Contact information may be received pertaining to the user, and the second incentive may be provided to the user according to the received contact information.

Other and further objects, features, and advantages of the present invention will be readily apparent to those skilled in the art.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION OF THE INVENTION

Definitions

Figure 1:
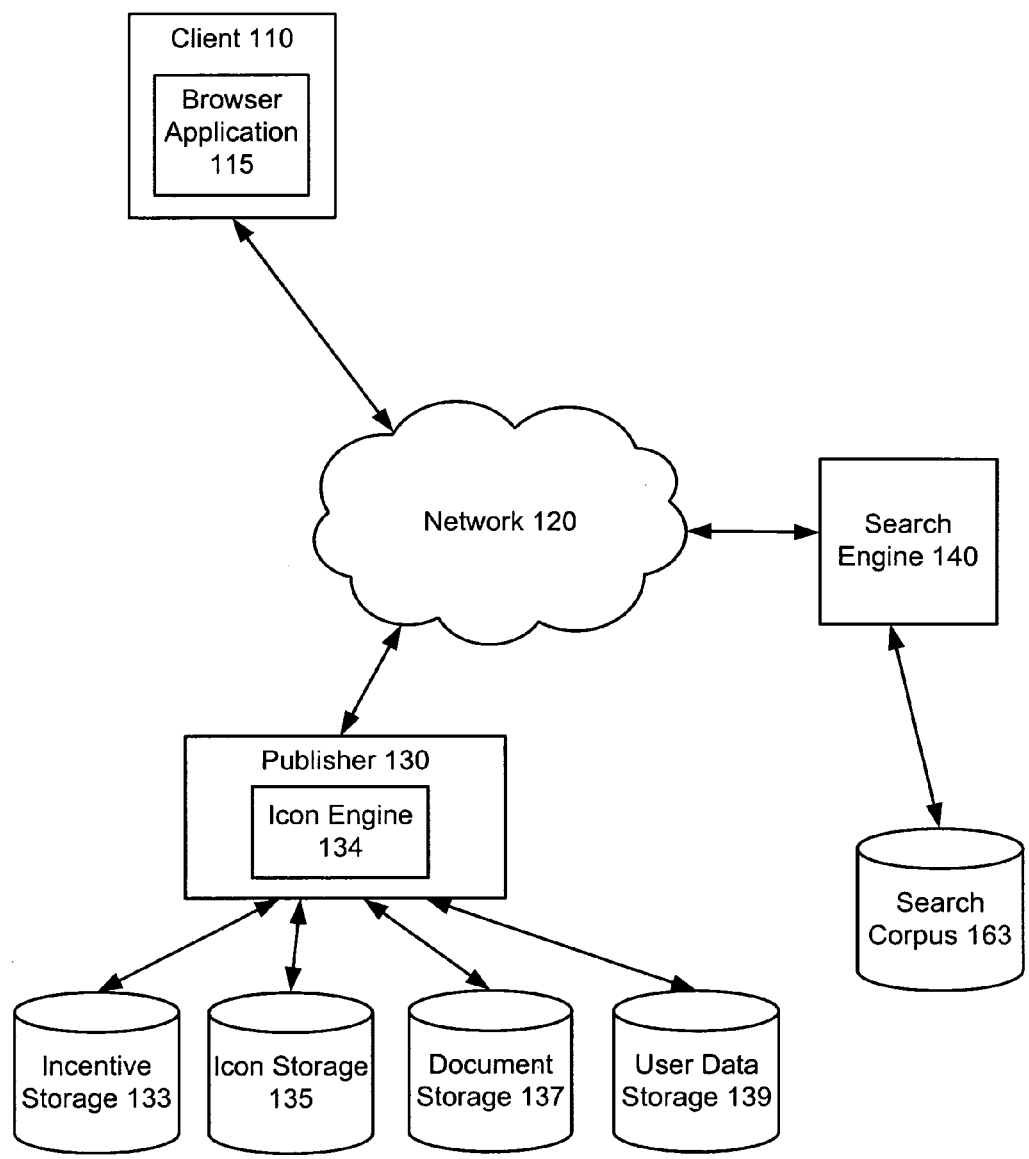
FIG. 1 is an illustration of an exemplary environment for providing a digital advertising experience using a video-rich icon.

The term video-rich icon may refer to an animated icon that is displayed on, over, or about, at least a portion of a webpage, e.g., by a browser. The video-rich icon may be displayed using a pop-up window, takeover, or any other method for displaying data or content in a browser. The video-rich icon may include one or more video animations and may be photo-realistic or stylized. The video-rich icon may depict a variety of creatures or things and may include a companion animal such as a dog or cat. The video-rich icon optionally may include audio elements. The video-rich icon can move over the entire webpage, and guides the user to different regions of content on the webpage. Thus, the video-rich icon is not limited to a particular region on the webpage, such as would be the case with a banner, for example.

The term document may refer to a webpage, a video, an image, an advertisement or any other type of data or content.

As used herein, the singular form of a word includes the plural, and vice versa, unless the context clearly dictates otherwise. Thus, the references "a", "an", and "the" are generally inclusive of the plurals of the respective terms. For example, reference to "a method" includes a plurality of such "methods." Similarly, the words "comprise", "comprises", and "comprising" are to be interpreted inclusively rather than exclusively. Likewise the terms "include", "including" and "or" should all be construed to be inclusive, unless such a construction is clearly prohibited from the context.

The methods, systems, and other advances disclosed here are not limited to particular methodology, protocols, and techniques described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any, methods, systems, or other means or materials similar or equivalent to those described herein can be used in the practice of the present invention, the preferred methods, systems, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The Invention

In one aspect, the invention provides advertising methods useful for advertising to consumers. The methods comprise providing, by a computing device, an entry content that comprises a selectable region of content; enabling, by the computing device, a video-rich icon on the entry content that encourages a selection of the selectable region of content; receiving, by the computing device, an indication of the selection of the selectable region of content; providing, by the computing device in response to receiving the indication of the selection, a destination content that comprises an additional selectable region of content; and enabling, by the computing device, the video-rich icon on the destination content that encourages selection of the additional selectable region of content. In another aspect, the invention provides advertising systems useful for advertising to consumers. The advertising systems comprise at least one computing device and an icon engine that provides a sponsored content for display on a portal webpage; provides a video-rich icon for display on the portal webpage, wherein the video-rich icon directs a selection of the sponsored content; receives an indication of the selection to the sponsored content; and provides an additional sponsored content for display on a destination webpage and the video-rich icon for display on the destination webpage, wherein the video-rich icon directs a selection of the additional sponsored content. The inventions are based upon and derived from the discovery of innovative methods of using the internet and web-based technology to reach consumers in new and different ways. The methods and systems of the invention are designed to influence the online behavior of consumers to keep them engaged in web-based content, lead consumers to additional content, and reward them for continued engagement with their browsing experience as it relates to branded content.

Unlike online experiences currently available, the methods and systems of the present invention provide a digitally guided tour through online advertising, through the use of a video-rich icon. The icon serves not only to entertain the user, but to continually guide the user back to desired content, such as branded content. The icon interacts with the user through rich video and/or audio units, guiding the user to enhanced editorial content partnered with brand messaging. The icon can influence consumer behavior in a variety of ways, including but not limited to (1) providing a guided tour of relevant content and allowing the user to select from additional alternatives, and (2) recapturing the user's attention and directing it back to the specific path of media content.

Another aspect of the invention provides an added feature comprising a progressive incentive, such as a coupon or other value added offer, to entice consumers to interact and deepen their guided online experience. Thus, for example, a consumer may be served an incentive when he chooses to engage with the experience. The incentive may increase in value the longer the consumer remains engaged with the icon's selected content, for example, or the longer the consumer continues his experience by selecting additional activities or destinations offered by the advertiser or content creator.

Other aspects of the invention may also utilize creative retargeting to capture the attention of users who do not complete their experience and provide them with an opportunity or incentive to continue their experience at another time, or to entice engaged users to try a different targeted experience after completing their previous interaction.

Thus, the present invention achieves the aforementioned objectives, and many others, by providing a surprise element in the targeted consumer's normal web browsing experience. The experience guides consumers to relevant content and rewards them for continued interaction. Currently used rich media banners and other approaches heretofore used are unable to break through web page clutter and engage consumers in the manner provided by the invention.

FIG. 1 is an illustration of an exemplary environment 100 for providing a digital advertising experience using a video-rich icon. A client 110 may communicate with a search engine 140 and/or a publisher 130 through a network 120. The client 110 may be configured to communicate with the search engine 140 and/or publisher 130 to access, receive, retrieve and display documents and other information including webpages. The network 120 may be a variety of network types including the public switched telephone network (PSTN), a cellular telephone network, and a packet switched network (e.g., the Internet).

In some implementations, the client 110 may include a desktop personal computer (PC), workstation, laptop, PDA, cell phone, or any WAP-enabled device or any other computing device capable of interfacing directly or indirectly with the network 120. The client 110 may run an instance of a browser application 115. The browser application 115 may be an HTTP client such as Microsoft Internet Explorer, Mozilla Firefox, Google Chrome, Apple Safari, or some other browser. The browser 115 may also include a WAP-enabled browser in the case of a cell phone, PDA or other wireless device, or the like, allowing a user of the client 110 to access, process and view information and webpages available to it from the search engine 140 or publisher 130. The client 110 may be implemented using a general purpose computing device such as the computing device 700 described with respect to FIG. 7, for example.

The search engine 140 may be configured to receive queries from users using clients such as the client 110. The search engine 140 may search for documents and other media that are responsive to the query by searching a search corpus 163 using the received query. The search corpus 163 may comprise an index of documents such as webpages, advertisements, image data, video data, map data, etc. that is available from one or more publishers 130. The search engine 140 may return a webpage to the client 110 including indicators such as links to some subset of the documents available at one or more publishers 130 that are responsive to the query.

The publisher 130 may make documents such as webpages and advertisements available to users over the network 120. The documents may be stored in a document storage 137. The documents may include identifiers such as links to other documents in the document storage 137. In addition, the documents may include identifiers to documents available at other publishers (not shown).

The publisher 130 may be a content provider or an advertiser. In some implementations, the publisher 130 may provide what is known as a portal. A portal may be a webpage that includes multiple links to other documents or webpages presented in a unified way. Portals may also include links to applications such as the search engine 140. The documents may be stored at the document storage 137 of the publisher 130 or another publisher. Portals may provide a unified look and feel to the provided links and applications. Examples of popular portals include yahoo.com, msnbc.com, and iGoogle.com.

The publisher 130 may further include an icon engine 134. The icon engine 134 may provide one or more video-rich icons for display on or about an entry content or a destination content (i.e., on or about at least a portion of the entry content or destination content, for example) provided by a publisher 130, such as a portal webpage. As used herein, an entry content refers to one of a webpage, a portal webpage (e.g., an information portal, a search engine portal, etc.), an entry website, a content page, or a combination thereof. A destination content refers to content visited or otherwise provided, presented, or displayed after an entry content (e.g., responsive to a user selection of an element, item, or icon, for example, associated with the entry content) and may include one or more additional or subsequent webpages and/or pop-up windows or messages, for example. The icon engine 134 may be implemented using a general purpose computing device such as the computing device 700 described with respect to FIG. 7. In addition, while the icon engine 134 is illustrated as a component within the publisher 130, it is for illustrative purposes only; the icon engine 134 may be implemented separately from the publisher 130 using an independent computing system, for example.

The video-rich icons may comprise video icons and may include video clips or other animated graphics. The video-rich icons may be displayed on top of a webpage (i.e., on top of at least a portion of a webpage, for example) in what is known as a takeover. Other methods for displaying the video-rich icons such as pop-up windows may also be used. The video-rich icons may be implemented using a variety of methods and programming languages such as Adobe Flash, Ajax, and JavaScript. Other programming languages may also be used. The video-rich icons, or data pertaining to the video-rich icons, may be stored in an icon storage 135.

In some implementations, the video-rich icons may comprise depictions of humans, companion animals, or pets such as cats, dogs, horses, etc. The video-rich icons may also depict objects such as cars, for example. The video-rich icons may be photorealistic or may be artistic renderings such as cartoons. The video-rich icons may further be associated with a brand. For example, a video-rich icon depicting a cat may be associated with a brand of dog or cat food, and a video-rich icon depicting a car may be associated with a brand of cars.

The video-rich icons may provide an enhanced browsing experience to a user at a portal webpage or other webpage while also promoting the brand associated with the video-rich icon. In some implementations, the video-rich icons may provide an enhanced browsing experience by interacting with one or more webpage elements displayed in a webpage. The webpage elements may include advertisements, graphics, selectable links, or any other selectable or interactive components or content regions of a webpage.

In some implementations, the video-rich icons may interact with one or more webpage elements to focus a user's attention on a particular element or otherwise encourage a user to select or interact with a particular element or region of content. For example, a video-rich icon depicting a cat may encourage a user to select a particular link or view a region of content by playing near the link or scratching at the region of content. As described above, the video-rich icon may be implemented as a takeover, allowing the video-rich icon to move substantially about the webpage and the webpage elements.

In some implementations, the video-rich icon may follow a user across multiple webpages or various contents to create an enhanced browsing experience. The video-rich icon may follow the user from a one content (e.g., an entry content such as a first webpage or other content) to a destination content (e.g., a subsequent or second webpage or other content) when the user provides an indication of a selection to a link or other selectable region that the video-rich icon encouraged the user to select.

In some implementations, the video-rich icon may interact with a user using pop-up messages or other interactive elements. A pop-up message including a greeting may be activated when a user's cursor is near or on top of the video-rich icon. Alternatively, the pop-up message may appear randomly, at a set time, or after a preset amount time has passed since a last interaction with the user. The video-rich icon may further change colors or animations when selected by the user to encourage the user to interact with the video-rich icon.

Continuing the example described above, the cat video-rich icon may scratch at a suggested link to a webpage, or a pop-up message may be displayed encouraging the user to select the suggested link. After the user selects the link, the cat video-rich icon may appear on the webpage corresponding to the selected link. The cat video-rich icon may further encourage the user to select other links, and may then appear on webpages corresponding to the selected other links. In this way, the video-rich icon provides an enhanced browsing experience to the user throughout a browsing session.

As described above, the video-rich icon may be associated with a brand. To integrate the brand into the enhanced browsing experience, the content of the webpages associated with the links or content regions that the video-rich icon encourages a user to select may comprise what is known as sponsored content. The sponsored content may include links, documents, files, graphics, videos, advertisements, or other content that has been selected and/or approved, either directly or indirectly, by an advertiser or other person or persons associated with the brand.

Continuing the example above, the cat video-rich icon may be associated with a brand of cat food. The cat video-rich icon may encourage a user to select a link associated with content sponsored by the brand of cat food. The link may indicate that the content is music related, for example. After the user selects the link, the webpage associated with the selected link may be displayed. The webpage may include music related sponsored content. For example, the webpage may include information about musical groups that are on a tour sponsored by the brand of cat food, or may include musical groups with cat or feline related names.

Further, the video-rich icon displayed on a webpage may be tailored or animated according to the theme of the selected page. For example, the cat video-rich icon may appear in a rock-and-roll styled outfit or dance to pre-recorded music that may be played on the webpage. The user may change the dance performed by the cat by selecting the video-rich icon. By incorporating the theme of the webpage into the video-rich icon, the user may be encouraged to continue to select sponsored content or interact with the video-rich icon (and therefore interact with the brand) to view more variations of the video-rich icon.

In some implementations, the video-rich icon may receive queries or other information from the user. For example, the video-rich icon may display a text box that when selected allows the user to submit queries through the video-rich icons. The queries may comprise general search terms (which may be fulfilled by the search engine 140), or may comprise brand related questions. Continuing the example described above, the user may ask the cat video-rich icon for a nearest merchant where the cat food may be purchased. The queries may be processed automatically using a variety of known methods for natural language processing. Alternatively, the queries may be received and processed by a live operator or administrator.

In some implementations, there may be multiple video-rich icons that are displayed on a webpage. The video-rich icons may interact with one another and may direct the user to different portions of sponsored content. Continuing the example described above, a cat video-rich icon dressed as a football player may encourage a user to view sponsored content related to football, while a cat video-rich icon dressed in a suit may encourage a user to view sponsored content related to fashion. The two video-rich icons may interact with one another by playing or talking to each other, for example.

In some implementations, the icon engine 134 may further provide incentives for a user to interact with one or more of the webpage elements or the video-rich icon. The incentives may include coupons, trial offers, rebates, sweepstake enrollments, award or loyalty points, etc. Any type of incentives may be used. The incentives may indicated by an advertisement or graphic displayed on the webpage. The incentives may be indicated by text, graphics, video, or other indication that the incentive is associated with the video-rich icon or the brand associated with the video-rich icon. The incentives or data pertaining to the incentives may be stored by the icon engine 134 in incentive storage 133, for example.

Continuing the example described above, the video-rich icon of the cat associated with the brand of cat food may be displayed on a webpage. Also appearing on the webpage may be a graphic indicating an incentive such as a free sample of cat food that may be awarded to the user if they select to interact with the video-rich icon or follow a link suggested by the video-rich icon, for example.

In some implementations, the incentives offered to a user may increase based on the amount of time that a user chooses to interact with the video-rich icon or may increase based on the number of links that the user selects. Activities that may generate increased incentives include, but are not limited to, (1) number of items on the content page of the entry website or destination websites explored; (2) time spent on selected items of the content page; (3) total time spent navigating the entry website or destination websites in a single session or other selected time period; (4) number of purchases made through a destination website; (5) monetary value of purchases made through a destination website; or (6) any combination thereof. In one implementation, one or more of such activities is quantifiable, e.g., through the collection and analysis of interaction data as described below, so that the effectiveness of the online advertising method can be measured.

Continuing the example above, at an initial webpage, the incentive may be a 10% off coupon for cat food. At subsequent webpages of the browsing session, the incentive may increase to a 20% off coupon. Such escalating incentives may further encourage the user to interact with the video-rich icon for a longer amount of time or to view more sponsored content, for example.

In some implementations, the icon engine 134 may further collect and/or maintain user data. The user data may include user names, addresses, email addresses, birthdays, photos, and other information collected from users. For example, the user data may be collected from a user to provide an incentive to the user, and to provide other promotional offers to the user. The user data may be collected and stored according to a privacy policy or other agreement available from the publisher 130. The user data may be stored by the icon engine 134 in a user data storage 139, for example.

In some implementations, the user data may further include interaction data. The interaction data may include information that describes the extent of the user's previous interactions with a brand and video-rich icons associated with the brand. The user interaction data may allow a user to continue a previous interaction with a video-rich icon after a previous session ended or was otherwise abandoned by the user. The user interaction data may be associated with a cookie stored in the browser application 115 associated with user or may be tied to another user identifier such as an IP address associated with the user or a user id associated with the publisher 130, for example.

In some implementations, the user data may be used by the icon engine 134 to select the video-rich icon that is displayed to the user or to determine an incentive to provide to the user. For example, during a previous session, the user may have been offered a 30% off coupon before the user ended the session. Accordingly, the icon engine 134 may offer the user an incentive that is equal or greater than the incentive previously offered. In addition, the user data may indicate that the user has already been shown particular animations or themed video-rich icons during previous sessions, and therefore new or unseen video-rich icons may be presented to the user.

The icon engine 134 may further be used to personalize the video-rich icon or other information that is presented to the user. For example, the video-rich icon or other sponsored content may refer to the user by their name, or may use a name and/or image of a pet or animal associated with the user.

The icon engine 134 may further measure an increase in quantifiable activity of a population of visitors on the entry content and/or on the destination content in the presence of the video-rich icon as compared with quantifiable activity of an equivalent population of visitors on the entry content and/or the destination content in the absence of the video-rich icon. In some implementations, the quantifiable activity may include one or more of: (1) number of items of the entry content or the destination content explored; (2) time spent on selected items of the entry content; (3) total time spent navigating the entry content or the destination content in a single session or other selected time period; (4) number of purchases made through the destination content; (5) monetary value of purchases made through the destination content; and (6) any combination thereof.

Figure 2:
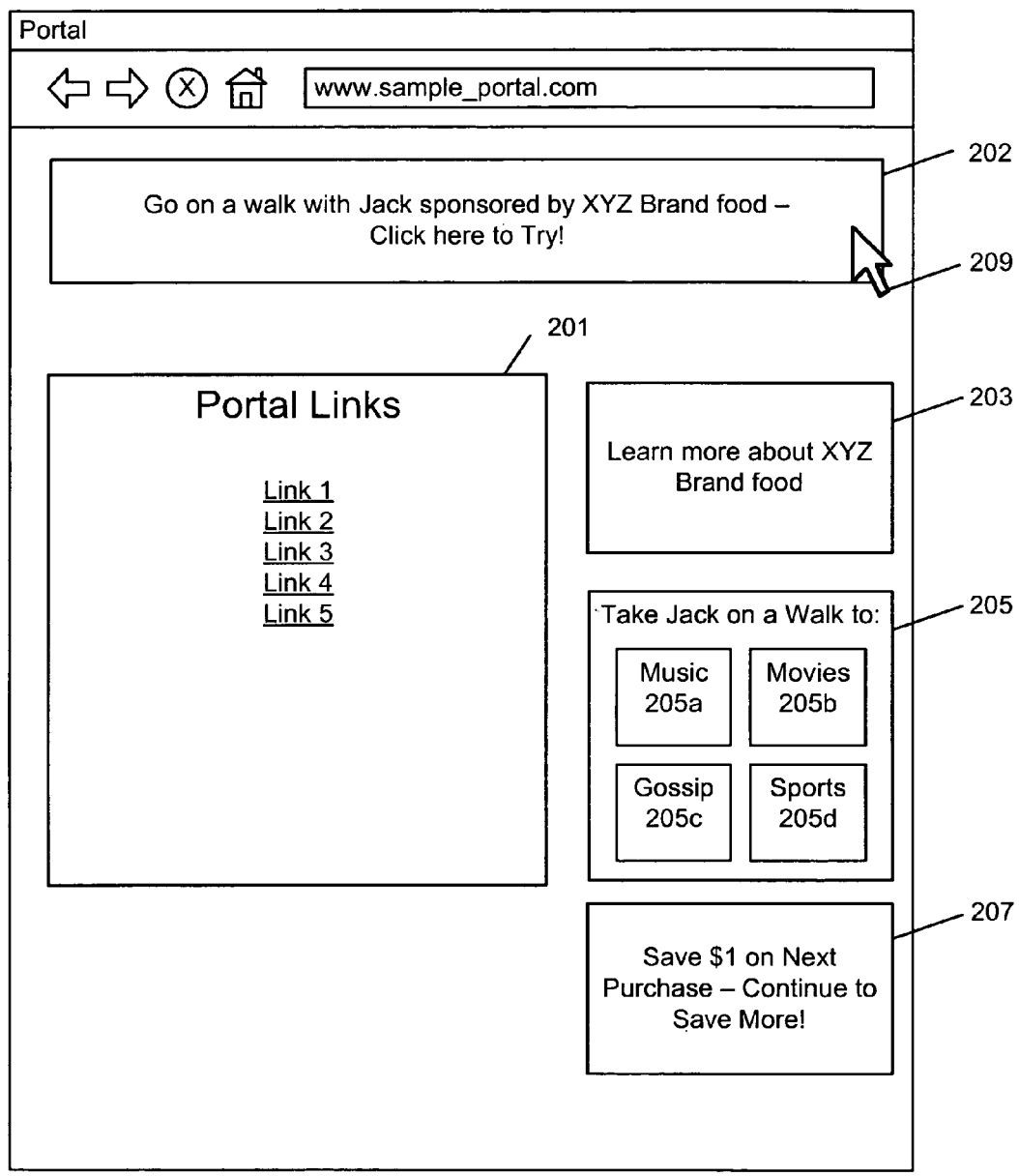
FIG. 2 is an illustration of example window of a browser application viewing a portal webpage.

FIG. 2 is an illustration of example window 200 of a browser application 115 viewing a portal webpage. As shown, the webpage illustrated in the window 200 includes various regions of content as illustrated by the content regions 201, 202, 203, 205, and 207. The content regions may include sponsored content and non-sponsored content. In the example shown, the region 201 may include non-sponsored content in the form of selectable links 1-5. The regions 202, 203, 205, and 207 may include sponsored content such as advertisements.

In an implementation, the user may use the browser application 115 of the client 110 to view the webpage corresponding to a URL, such as the "www.sample_portal.com" for example. An example corresponding webpage is shown in the window 200.

The user may interact with the various regions and elements of the window 200 using a pointer 209. The pointer 209 may be controlled by the user using a mouse or other user interface device. The user may view the message displayed in the region 202 inviting the user to click on the region 202 to begin an interaction with a video-rich icon named Jack that is associated with XYZ Brand food. The user may select (e.g., click on) the region 202 and an indication of a selection may be provided to the icon engine 134 by the browser application 115 of the client 110.

Figure 3:
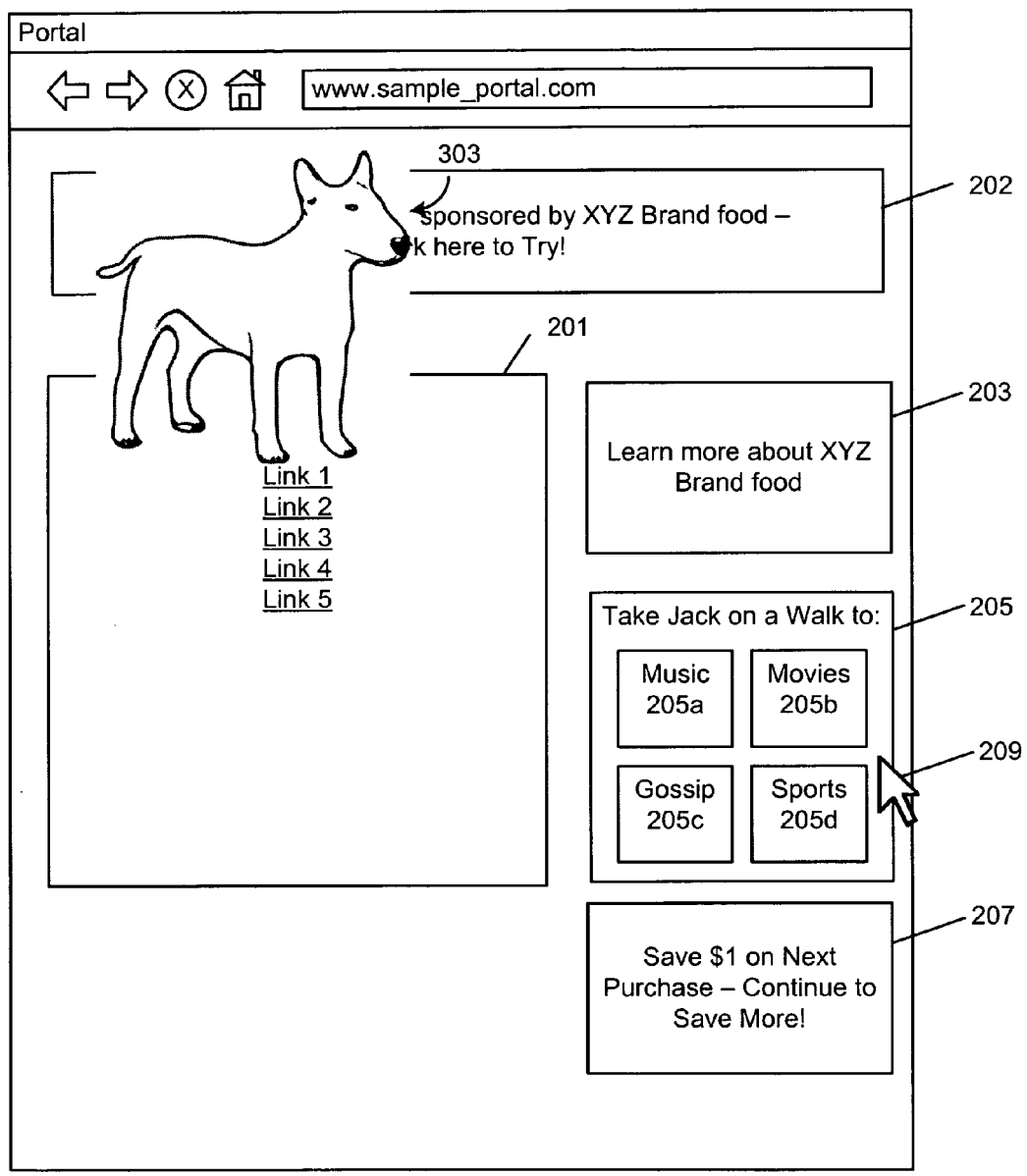
FIG. 3 is an illustration of the window after the user clicked on a region.

FIG. 3 is an illustration of the window 200 after the user clicked on the region 202. As illustrated, a video-rich icon 303 depicting the dog Jack is displayed in a takeover over the window 200. Because the video-rich icon 303 is displayed using a takeover, the video-rich icon 303 may obscure some of the content regions of the window 200, such as the content regions 201 and 202, for example. While not appreciable in the drawings, the video-rich icon 303 may be animated and may move about the window 200 to engage the user and to focus the user on sponsored content.

For example, the video-rich icon 303 may encourage the user to select one of the regions 205a, 205b, 205c, 205d (e.g., corresponding to "music", "movies", "gossip", and "sports", respectively in this example) of the sponsored content region 205. An incentive for selecting one of regions 205a-205d may also be displayed, e.g. in the region 207, as encouragement. As illustrated, the user has been offered a coupon for $1 off a next purchase. For example, the user may click on the region 205d, corresponding to sports related sponsored content, using the pointer 209, and an indication of a selection may be provided to the icon engine 134 by the browser application 115 of the client 110.

Figure 4:
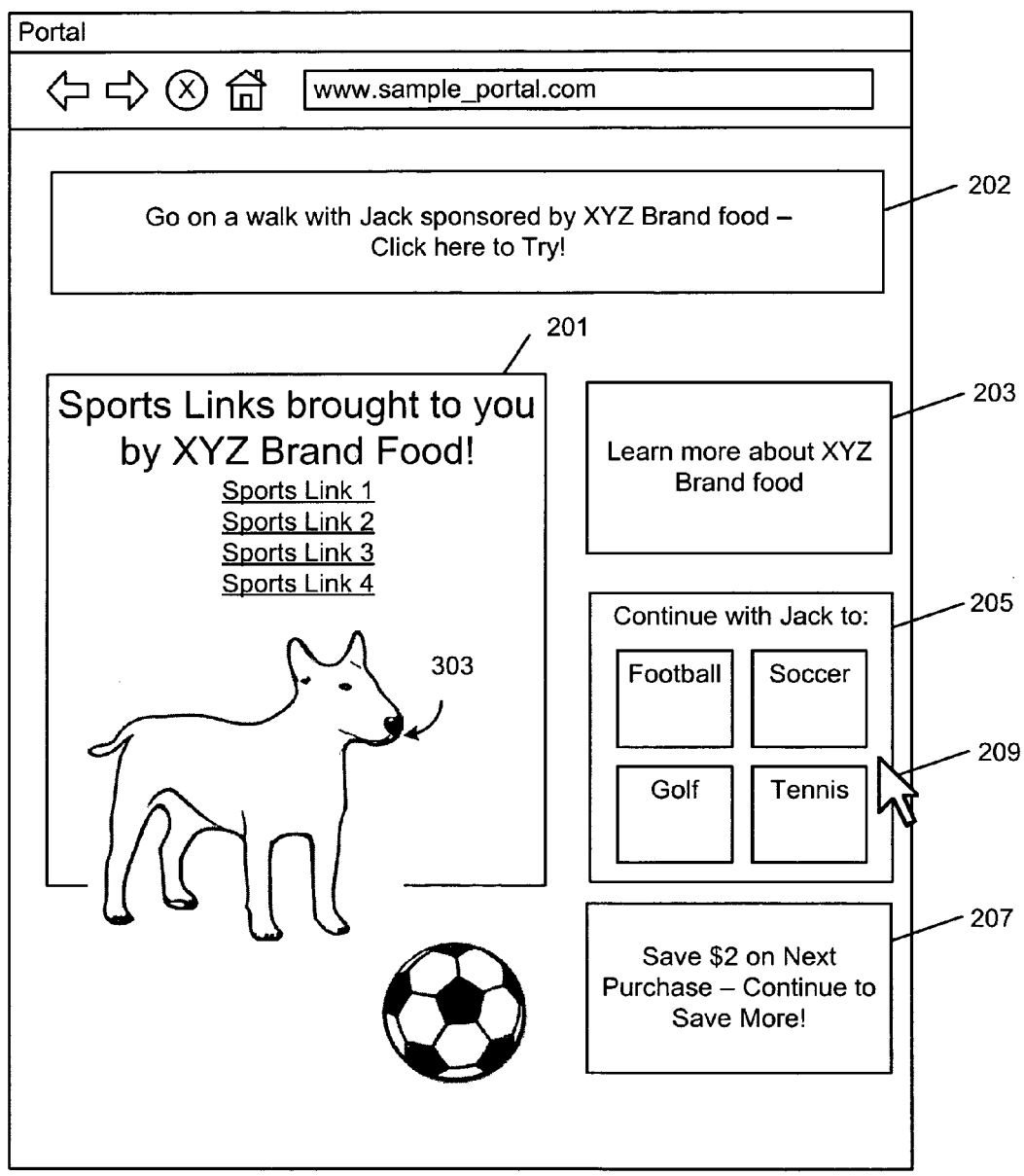
FIG. 4 is an illustration of the window after the user selected another region.

FIG. 4 is an illustration of the window 200 after the user selected the region 205d, for example. The window 200 now displays a sports related webpage as evidenced by the sports related links (e.g., sports links 1-4) displayed in the content region 201 of the webpage. In addition, the video-rich icon 303 has changed and is now performing an animation related to the sports theme of the webpage. For example, the video-rich icon 303 is now chasing a soccer ball across the window 200. Moreover, the incentive displayed in the region 207 has now been increased to provide a greater incentive to the user to continue selecting sponsored content or to continue to interact with the video-rich icon 303. The user may continue to interact with the sponsored content in the window 200, or may abandon the session by either closing the window 200 or by selecting some non-sponsored content. In the event the user chooses to abandon the session, some record of the session including the video-rich icon (or icons) 303 displayed and the incentives earned may be stored for the user in the user data storage 139 so that the session may be resumed at a later time by the user, in an implementation.

Figure 5:
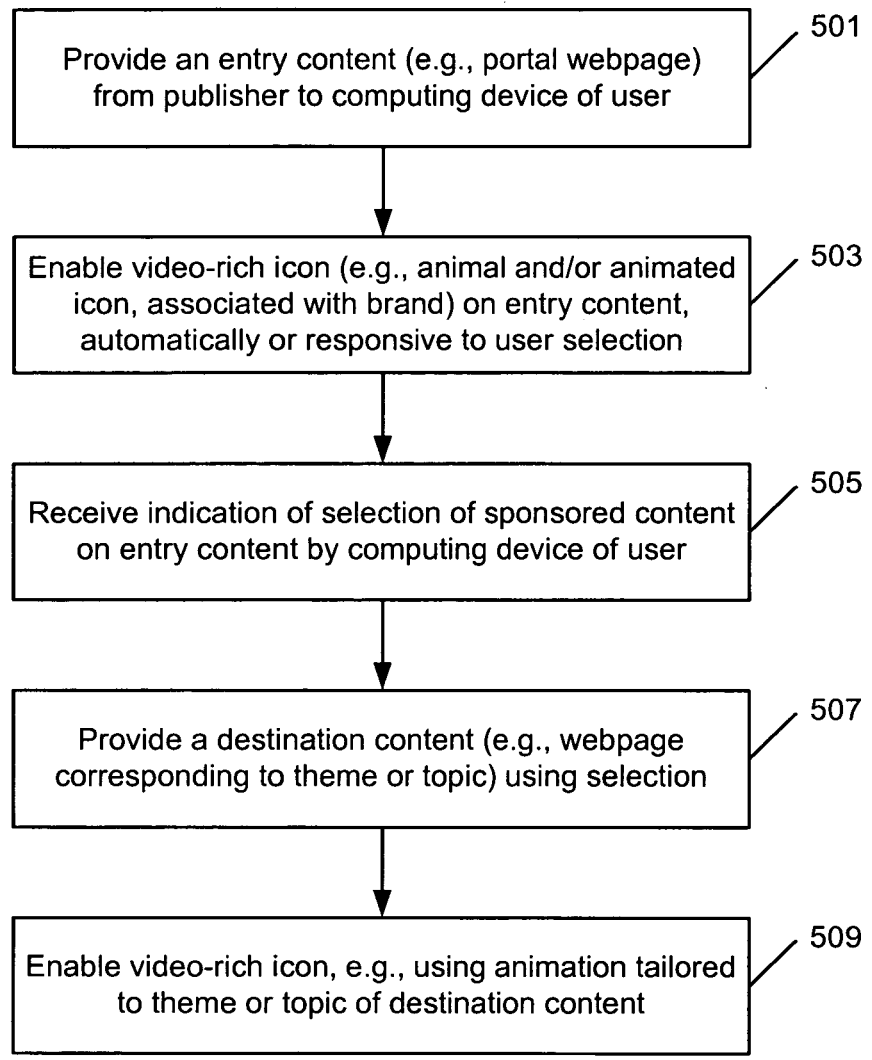
FIG. 5 is an operational flow of an implementation of an online advertising method using a video-rich icon.

FIG. 5 is an operational flow of an implementation of an online advertising method 500 using a video-rich icon. The method 500 may be implemented by the icon engine 134 of the publisher 130, for example.

An entry content is provided at 501. The entry content may be provided by the publisher 130. The entry content may be a portal webpage or a search engine webpage, for example, or other content as described further herein. The entry content may be provided to a user at a client 110 in a browser application 115, e.g., at a computing device of the user through a network such as the network 120.

A video-rich icon is enabled at 503. The video-rich icon may be enabled by the icon engine 134, e.g., using a takeover. In some implementations, the video-rich icon may be enabled in response to a user selection or may be enabled automatically when the entry content is loaded or rendered by the browser application 115. The video-rich icon may be an animated icon and may be associated with a brand, in an implementation. The video-rich icon may be of a companion animal such as a dog or a cat, for example. The video-rich icon may encourage a user to interact with one or more regions of sponsored content on the entry content or one or more items or elements of the entry content.

An indication of a selection is received at 505. The indication of a selection may be received by the icon engine 134. The indication of selection may have been generated by the browser application 115 in response to a selection made by the user to a region of sponsored content on the entry content.

Responsive to the selection, a destination content is provided at 507. The destination content may be provided by the publisher 130. The destination content may be a webpage or a pop-up window, for example, and may correspond to the theme or topic indicated by the selected sponsored content.

The video-rich icon is enabled on the destination content at 509. The video-rich icon may be enabled by the icon engine 134. The video-rich icon may be the same or different video-rich icon that was enabled at the entry content, but may perform a different animation or may encourage the user to interact with different or additional sponsored content. In addition, the animation used, or appearance of, the video-rich icon may be tailored to a theme or topic of the destination content. For example, if the destination content is related to finances, the video-rich icon may perform an animation that is related to money.

Figure 6:
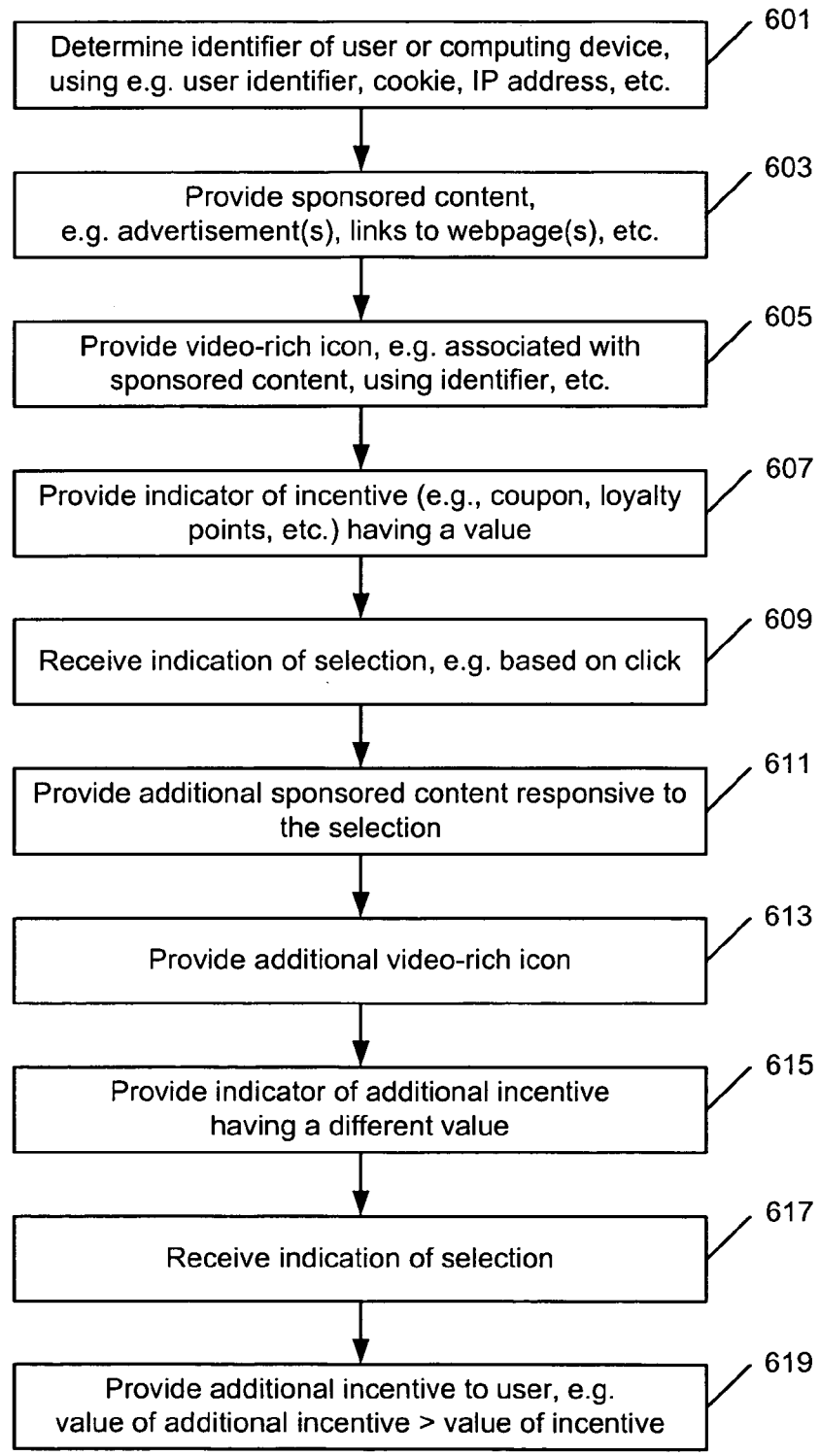
FIG. 6 is an operational flow of another implementation of an online advertising method using a video-rich icon.

FIG. 6 is an operational flow of another implementation of an online advertising method 600 using a video-rich icon. The method 600 may be implemented by the icon engine 134 of the publisher 130, for example.

An identifier of a user is determined at 601. The identifier of a user may be determined by the icon engine 134. The identifier of a user may be determined in response to a user requesting entry content from a publisher 130. The entry content may be a portal, for example, or other content as described herein. In some implementations, the identifier of a user may be determined using a cookie or other piece of code stored by a browser application 115 used by the user. The identifier of the user may also be determined by, or comprise, an IP address associated with a client 110 used by the user.

Sponsored content is provided at 603. The sponsored content may be provided by the icon engine 134. The sponsored content may comprise an advertisement that includes identifiers or links to one or more webpages featuring sponsored content. The sponsored content may be sized for placement on the entry content provided by a publisher 130. The entry content may be sponsored by a brand or a manufacturer, for example.

A video-rich icon is provided at 605. The video-rich icon may be provided by the icon engine 134. The video-rich icon may be associated with the same brand or manufacturer associated with the sponsored content. The video-rich icon may encourage the user to select or interact with the sponsored content. In some implementations, the video-rich icon may be selected by the icon engine 134 from the icon storage 135 using the user identifier. For example, the user identifier may indicate the video-rich icons that the user has already viewed or that may be determined appropriate based on characteristics of the user (e.g., location, residence address, age, gender, pets, employment, marital status, number and ages of children, etc.). To encourage the user to view the sponsored content, the video-rich icons may be rotated or varied such that the user may experience a variety of animations, for example.

An indicator of an incentive is provided at 607. The indicator of the incentive may be provided by the icon engine 134. The indicator of the incentive may comprise a graphic or video that indicates an incentive or other reward that the user may receive by selecting the sponsored content or interacting with the video-rich icon. The indication may be similarly sized for placement on the entry content by the publisher 130. In some implementations, the incentive may be selected from the incentive storage 133 using the user identifier.

An indication of a selection is received at 609. The indication of a selection may be received by the icon engine 134. The indication of a selection may indicate that the user has selected or clicked on the sponsored content in the entry content, for example.

Additional sponsored content is provided at 611. The additional sponsored content may be provided by the icon engine 134. The additional sponsored content may be sized for placement on a destination content generated in response to the selection of the sponsored content.

An additional video-rich icon is provided at 613. The additional video-rich icon may be provided by the icon engine 134. In an implementation, the additional video-rich icon may feature the same animal, character, or image used for the video-rich icon on the entry content but may perform a new or different animation than the animation used for the video-rich icon. The additional video-rich icon may encourage the user to select the additional sponsored content.

An indicator of an additional incentive is provided at 615. The indicator of the additional incentive may be provided by the icon engine 134. The indicator of the additional incentive may be sized for placement on the destination content generated in response to the selection of the sponsored content. The additional incentive may be greater (e.g., have a higher value) than the incentive to encourage the user to select the additional sponsored content or to interact with the additional video-rich icon.

An indication of a selection may be received at 617. The indication of a selection may be received by the icon engine 134. The indication of a selection may indicate that the user has selected or clicked on the additional sponsored content of the second webpage.

The additional incentive is provided to the user at 619, e.g., by the icon engine 134. If the user chooses to end the session by either exiting the browser application 115 or selecting non-sponsored content, the icon engine 134 may present the user with the incentive(s) earned thus far. In some implementations, the user may be asked to supply an email address where the incentive(s) can be sent. Alternatively, the incentive(s) may be displayed on a webpage. For example, where the incentive is a coupon, a webpage may be displayed that allows the user to print the coupon using a printer. In addition, the user may provide a mailing address and the coupon may be mailed to the user. Depending on the implementation, the incentives may be mailed, emailed, faxed, or otherwise physically or electronically transmitted to an address or location provided by the user. Any information provided by the user may be stored in the user data storage 139, for example.

Figure 7:
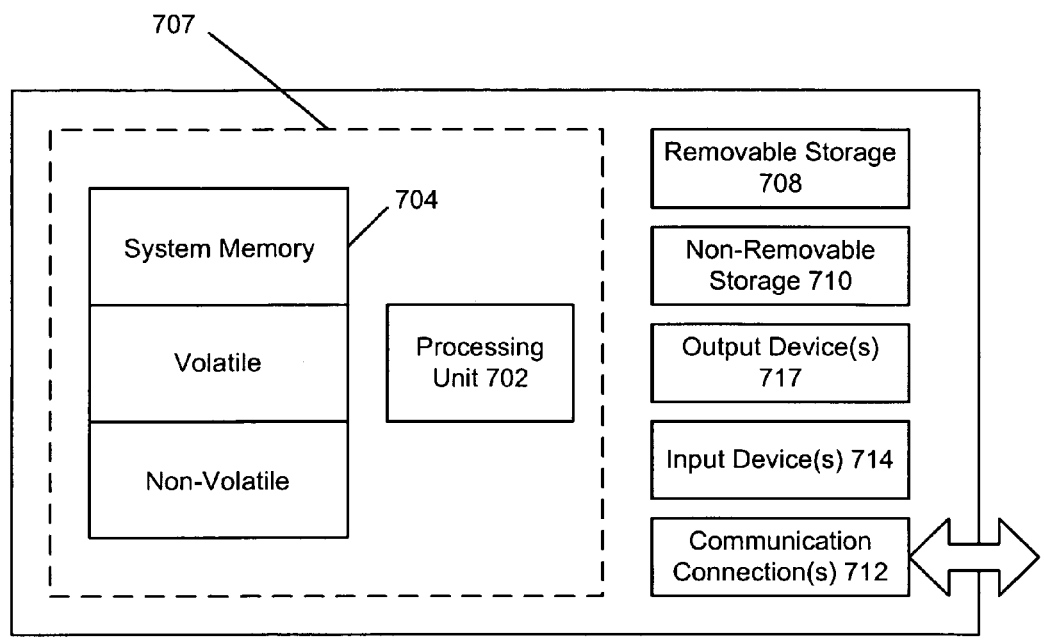
FIG. 7 shows an exemplary computing environment in which example embodiments and aspects may be implemented.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 707.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by computing device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 717 such as a display, speakers, printer, etc. may also be included. All these devices are well known in the art and need not be discussed at length here.

In other aspects, the invention provides advertising or advertisements produced in accordance with the methods of the invention.

In further aspects, the invention provides devices comprising the advertising of the present invention, e.g., a computer system displaying the advertising or a webpage displaying the advertising. In one embodiment, the device is a Smartphone, e.g. an iPhone®, Blackberry®, or a Droid®.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

In the specification, there have been disclosed typical preferred embodiments of the invention. Although specific terms are employed, they are used in a generic and descriptive sense only and not for purposes of limitation. The scope of the invention is set forth in the claims. Many modifications and variations of the invention are possible in light of the above teachings. It is therefore to be understood that within the scope of the appended claims, the invention may be practiced otherwise than as specifically described.

What is claimed is:

1. An advertising method comprising:
   providing, by a computing device, an entry content that comprises selectable regions of the entry content which comprise a first selectable region of the entry content;
   providing, by the computing device, a pointer on the entry content, the pointer allowing a user to individually select the selectable regions of the entry content;
   enabling, by the computing device, a video-rich icon on the entry content that encourages a selection of the first selectable region of the entry content, the enabling of the video-rich icon on the entry content comprises display of the video-rich icon as a distinct component of the entry content relative to the selectable regions of the entry content and relative to the pointer on the entry content;

receiving, by the computing device, an indication of the selection of the first selectable region of the entry content;

providing, by the computing device in response to receiving the indication of the selection, a destination content that comprises selectable regions of the destination content, the selectable regions of the destination content comprise at least one selectable region which comprises content different than that of each of the selectable regions of the entry content, the selectable regions of the destination content comprise a first selectable region of the destination content;

providing, by the computing device, the pointer on the destination content, the pointer allowing a user to individually select the selectable regions of the destination content; and enabling, by the computing device, the video-rich icon on the destination content, the video-rich icon on the destination content encourages selection of the first selectable region of the destination content, the enabling of the video-rich icon on the destination content comprises display of the video-rich icon as a distinct component of the destination content relative to the selectable regions of the destination content and relative to the pointer on the destination content.

2. The method of claim 1 wherein the entry content further comprises an indicator of an incentive for selecting the first selectable region of the entry content, and the destination content further comprises an indicator of an incentive for selecting the at least one selectable region of content which comprises content different than that of each of the selectable regions of the entry content.

3. The method of claim 1 wherein the video-rich icon is implemented using a takeover in which the entry and destination contents are provided by at least one webpage and the video-rich icon obscures at least a portion of the at least one webpage.

4. The method of claim 1 wherein the video-rich icon is an animated video of an animal.

5. The method of claim 1 wherein the first selectable region of the entry content comprises sponsored content promoting a brand.

6. The method of claim 1 wherein the entry content comprises a portal webpage, a search engine webpage, or a combination thereof.

7. The method of claim 1 wherein the video-rich icon comprises one or more of video images of a real object, animated images, static images, interactive images, or any combination thereof.

8. The method of claim 1 wherein the destination content comprises one or more of a webpage, a pop-up window, or any combination thereof.

9. The method of claim 1 further comprising providing additional destination content and enabling the video-rich icon on the additional destination content.

10. The method of claim 1 wherein the first selectable region of the entry content comprises least one pop-up message related to an item of the entry content.

11. The method of claim 1 further comprising measuring an increase in quantifiable activity of a population of visitors on the entry content and/or on the destination content in the presence of the video-rich icon as compared with quantifiable activity of an equivalent population of visitors on the entry content and/or the destination content in the absence of the video-rich icon.

12. A non-transitory, computer-readable medium comprising an advertisement produced using the method of claim 1.

13. A computing device comprising at least one processing unit and capable of executing instructions for producing an advertisement using the method of claim 1.

14. The method of claim 1 wherein the display of the video-rich icon on the entry content comprises displaying the video-rich icon at a first position that is a first distance from the first selectable region of the entry content and comprises moving the video-rich icon from the first position to a second position in which the video-rich icon (i) partially overlaps the first selectable region of the entry content or (ii) is a second distance from the first selectable region of the entry content, the second distance less than the first distance.

15. The method of claim 1 wherein the entry content is a first webpage, the destination content is a second webpage that is a different webpage relative to the first webpage, the display of the video-rich icon on the entry content comprises displaying the video-rich icon at a first position on the first webpage, the display of the video-rich icon on the destination content comprises displaying the video-rich icon at a second position on the second webpage, and the second position is a different distance from at least one side of the second webpage relative to a distance of the first position from the corresponding side of the first webpage.

16. The method of claim 2 wherein the incentive for selecting the first selectable region of the destination content has a greater value than incentive for selecting the first selectable region of the entry content.

17. The method of claim 2 wherein the incentive for selecting the first selectable region of the entry content is a coupon that has a value and the incentive for selecting the first selectable region of the destination content is a coupon that has a value that is greater than the value of the incentive for selecting the first selectable region of the entry content.

18. The method of claim 4 wherein the destination content has an associated theme, and the animated video of the animal is related to the associated theme.

19. The method of claim 10 wherein the pop-up message is an audio message, a visual message, or a combination thereof.

20. The method of claim 19 wherein the pop-up message contains one or more of: information about an item of the entry content; a suggestion to explore an item of the entry content or to navigate to the destination content; and an incentive-based invitation to explore an item of the entry content or to navigate to the destination content.

21. The method of claim 11 wherein the quantifiable activity comprises one or more of: (1) number of items of the entry content or the destination content explored; (2) time spent on selected items of the entry content; (3) total time spent navigating the entry content or the destination content in a single session or other selected time period; (4) number of purchases made through the destination content; (5) monetary value of purchases made through the destination content; or (6) any combination thereof.

22. The device of claim 13 comprising a Smartphone, cell phone, PDA or other wireless device, or a computer system.

* * * * *